United States Patent [19]

Dozier

[11] Patent Number: 5,190,013
[45] Date of Patent: Mar. 2, 1993

[54] ENGINE INTAKE VALVE SELECTIVE DEACTIVATION SYSTEM AND METHOD

[75] Inventor: Henry C. Dozier, Rochester Hills, Mich.

[73] Assignee: Siemens Automotive L.P., Auburn Hills, Mich.

[21] Appl. No.: 819,044

[22] Filed: Jan. 10, 1992

[51] Int. Cl.⁵ .................. F02D 13/06; F02D 41/04; F01L 25/08
[52] U.S. Cl. .................. 123/481; 123/90.11; 123/198 F; 123/435
[58] Field of Search ............ 123/90.11, 90.15, 90.16, 123/425, 435, 198 F, 481

[56] References Cited

U.S. PATENT DOCUMENTS

| 4,499,870 | 2/1985 | Aoyama | 123/198 F |
| 4,576,128 | 3/1986 | Kenichi | 123/198 F |
| 4,700,684 | 10/1987 | Pischinger et al. | 123/90.11 |
| 4,945,870 | 8/1990 | Richeson | 123/90.11 |
| 4,976,228 | 12/1990 | Kawamura | 123/198 F |
| 4,979,481 | 12/1990 | Shimomura et al. | 123/481 |
| 4,995,351 | 2/1991 | Ohkubo et al. | 123/90.11 |
| 5,045,796 | 9/1991 | Bentel et al. | 123/481 X |
| 5,119,783 | 6/1992 | Komurasaki | 123/481 X |
| 5,140,955 | 8/1992 | Sono et al. | 123/90.11 X |

Primary Examiner—Willis R. Wolfe
Attorney, Agent, or Firm—George L. Boller; Russel C. Wells

[57] ABSTRACT

When one of the combustion chambers is found to be operating non-compliantly, it is deactivated by the engine management computer preventing the electronic valve control computer from opening the solenoid-actuated intake valve for that combustion chamber.

19 Claims, 1 Drawing Sheet

ENGINE INTAKE VALVE SELECTIVE DEACTIVATION SYSTEM AND METHOD

FIELD OF THE INVENTION

This invention relates to internal combustion engines that are equipped with electromechanically operated valves which are under the control of an electronic valve timing (EVT) system.

BACKGROUND AND SUMMARY OF THE INVENTION

Automotive vehicles that are powered by internal combustion engines are required to comply with certain laws and regulations relating to exhaust emissions. Mandated requirements presently and prospectively include limits on certain noxious constituents in emitted exhaust gas and on-board diagnostic systems for detecting non-compliance. In fact, one prospective requirement is that a non-compliant fuel injector for an engine cylinder be shut off until the vehicle can be serviced for corrective action.

When an automotive vehicle is operating with its engine in compliance, it is expected that each one of its combustion chambers is individually operating in compliance. Non-compliant operation of an individual combustion chamber may occur for any of a number of different reasons including reasons other than a non-compliant fuel injector.

Other engine events which are apt to contribute to non-compliance may include, by way of example, failure of the ignition system to properly ignite combustible mixture in a combustion chamber, and failure of an EVT system to properly operate a valve. The root cause of any non-compliant operation may be due to non-compliant operation of any one or more of a number of individual components, such as fuel injectors, spark plugs, electronics, sensors, actuators, etc.

It is known to equip a spark-ignited internal combustion engine with electromechanically actuated cylinder valves which are under the control of an EVT system. The typical electromechanical actuator is solenoid-actuated. An example of an EVT system is disclosed in commonly assigned U.S. Pat. No. 4,957,074.

The present invention relates to an improvement in an EVT-equipped engine and is especially useful in alleviating effects of non-compliance in the operation of an individual combustion chamber. For example, an event of non-compliance that is limited to a single combustion chamber may be sufficient to cause the vehicle to become non-compliant, yet may go unnoticed by the vehicle operator. Other events of non-compliance may have the potential for damaging the engine and/or related systems, and may even detrimentally escalate if not promptly corrected.

A specific example of an effect of non-compliant operation of an individual combustion chamber is illustrated by an engine whose air-fuel mixture is controlled by an oxygen sensor in the exhaust. If the air-fuel mixture in that combustion chamber is improperly prepared and/or combusted, the resulting constituents in the combusted mixture will have an influence on the oxygen sensor indicating that the mixture is either too rich or too lean. The engine management computer will respond by altering the operation in a manner which will tend to compensate for the detected change. This, however, will result in corrective action being taken to compliantly operating combustion chambers with attendant liklihood of augmenting, rather than alleviating, the problem. For example, failure of a fuel injector which requires, under the aforementioned prospective requirement, that the fuel injector be shut off in order to minimize pollution effects pending servicing, will result in air being pumped from that cylinder into the exhaust. The consequent lean bias in the exhaust is detected by the oxygen sensor and results in the engine management computer either falsely shifting the mixture or forcing the operating mode from closed-loop to open-loop, impairing catalyst subsystem efficiency or even rendering the catalyst ineffective.

In general, the present invention proposes a solution to the aforementioned deficiencies by deactivating the intake valve of the non-compliantly operating combustion chamber upon detection of non-compliant operation so that the associated intake valve is kept closed. In this way, fresh charges of combustible mixture are prevented from entering the combustion chamber. So long as the engine is equipped with a sufficient number of combustion chambers, the vehicle can continue to be operated although it is to be expected that the operator will perceive that the engine is not operating properly. By taking this corrective action however, the compliant combustion chambers remain unaffected, and consequently, the effect of the non-compliant combustion chamber on exhaust emission constituents is ameliorated from what would otherwise have been the case if such corrective action had not been taken. Deactivation of the non-compliant combustion chamber's intake valve is accomplished by prohibiting its solenoid from being electrically operated to open the intake valve.

In its broadest sense the invention contemplates that the corrective action of deactivating a non-compliant cylinder's intake valve can be performed in response to detection of various forms of evidence of non-compliance. For instance, one or more inputs such as engine roughness at idle, manifold pressure, engine knock, are possibilities that are additional and/or alternative to the use of the oxygen sensor in this specific example described in the preceding paragraph. Events indicative of non-compliance can be logged in storage of the engine management computer in conventional fashion, such as by setting flags or semifore.

Further aspects of the invention along with those already mentioned will be described in the ensuing detailed description of a presently preferred embodiment representing the best mode contemplated at this time for carrying out the invention.

DESCRIPTION OF THE PREFERRED EMBODIMENT

Figure 1:
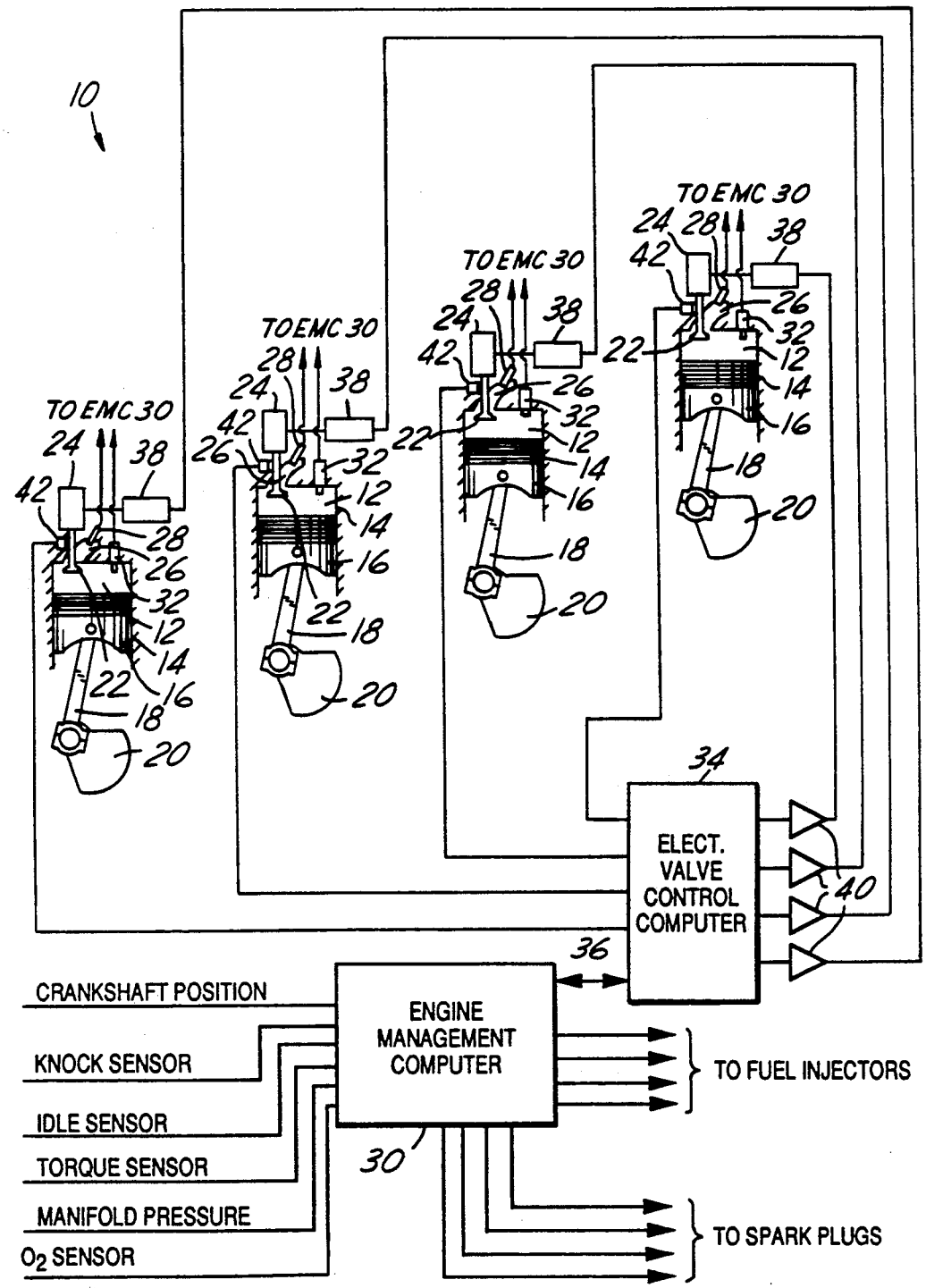
FIG. 1 is a schematic diagram of an internal combustion engine including an EVT system containing principles of selective cylinder deactivation according to the present invention.

FIG. 1 illustrates an exemplary spark-ignited, fuel injected, internal combustion engine 10 having four combustion chambers 12. The combustion chambers are in the form of cylinders 14 containing reciprocal pistons 16 linked by connecting rods 18 to a crankshaft 20. Although the drawing figure illustrates all pistons in the same angular position, the reader is expected to understand that in the actual engine the pistons are relatively phased for the combustion chambers operation in a predetermined repetitive firing order.

Associated with each cylinder is an intake valve 22 that is operated by an electromechanical actuator 24. Once again, the reader will appreciate that the intake valves are operated in appropriately timed sequences for assuring desired engine operation even though the drawing figure happens to show all intake valves open.

Each intake valve 22 controls the entry of combustible air-fuel mixture into the corresponding combustion chamber 12 from a runner 26 leading to the combustion chamber. An electrically operated fuel injector 28 is mounted in the wall of each runner and aimed to inject fuel toward the corresponding intake valve 22. The operation of each fuel injector 28 is under the control of an engine management computer 30, and the reader will understand that each fuel injector is operated at an appropriate time and for an appropriate duration by the computer to deliver a proper amount of fuel for entrainment with air passing through the corresponding runner 26 to form the combustible mixture introduced into the combustion chamber.

Spark plugs 32 are mounted on the engine, one per cylinder, for the purpose of delivering electrical sparks to the combustion chambers for igniting the combustible mixtures therein. The firing of each spark plug is also under the control of computer 30.

The EVT system includes an electronic valve control computer 34 that is coupled by a bi-directional data link 36 with computer 30. Computer 30 issues appropriate commands via data link 36 to computer 34 for operating intake valves 22 in properly timed manner. Each electromechanical actuator 24 includes a solenoid coil 38 which is selectively energized and de-energized by computer 34 through a corresponding driver circuit 40. The EVT system contains for each valve 22 a closed loop control which includes a valve position sensor 42 for sensing the position of valve 22 and supplying to computer 34 a feedback input representing valve position.

Computer 30 comprises a number of inputs, some of which are shown in FIG. 1. The illustrated inputs are: crankshaft position, knock sensor, idle sensor, torque sensor, manifold pressure, and oxygen sensor. This much of FIG. 1 that has just been described represents a known system.

In accordance with principles of the invention, computer 30 is programmed for detecting non-compliant combustion chamber operation by monitoring its various inputs, including those specifically illustrated, and generate signals indicative of non-compliant operation of one or more of the combustion chambers. It is further configured to communicate to computer 34 data that is effective to prevent the intake valves of non-compliantly operating combustion chambers from opening. Although the introduction of combustible mixture into a non-compliantly operating combustion chamber is thereafter prohibited, it is also desirable for the corresponding fuel injector and spark plug to be deactivated as well. Such deactivation is performed directly by the engine management computer 30.

The particular algorithm(s) for detecting non-compliance may implement any of the techniques that have been described earlier, i.e., sensing engine roughness at idle, etc. The root cause of the non-compliance may be due to non-compliant operation of one or more of a number of devices, for example: the ignition system and/or spark plug for a particular combustion chamber may not be operating properly; the fuel injector and/or fuel system may not be operating properly for that combustion chamber; or the EVT for that combustion chamber may not be operating properly.

Although the drawing does not illustrate an exhaust valve for each combustion chamber, the EVT-equipped engine typically has an electromechanically actuated exhaust valve for each combustion chamber, and they may be operated by computer 34 in suitable fashion. In the event of an indication of a non-compliant combustion chamber, computer 30 may be programmed with an algorithm that influences the operation of the corresponding exhaust valve.

Depending on the number of combustion chambers which an engine has, it may not be desirable to deactivate the intake valves of more than a certain number of combustion chambers. Computer 30 may be programmed with an appropriate algorithm to preclude such possibility.

Although the foregoing description has referred to a fuel-injected, spark-ignited engine, principles of the invention apply to any Otto cycle engine and any Diesel cycle engine. Fuel-injected engines may be either indirect injected as illustrated by FIG. 1, or direct injected.

What is claimed is:

1. An internal combustion engine comprising multiple combustion chambers each of which is repeatedly charged with a fresh combustible fluid mixture charge that is combusted therein to power the engine and subsequently exhausted therefrom, multiple valve means each associated with a corresponding combustion chamber for controlling the ingress and egress of combustible and combusted mixture to and from the corresponding combustion chamber, and multiple electromechanical actuator means each associated with a corresponding one of said valve means for controlling operation of same, electronic computing means for controlling certain components of the engine, including said multiple electromechanical actuator means, in accordance with multiple variables associated with engine operation, characterized by means for detecting when certain one or more of said multiple variables indicates deviation in the operation of any one of said combustion chambers from desired operation, and means responsive to such indication of such deviation for controlling the electromechanical actuator means associated with the corresponding valve means associated with said any one of said combustion chambers such that the corresponding valve means prevents the ingress of combustible mixture into said any one of said combustion chambers.

2. An internal combustion engine as set forth in claim 1 characterized further by multiple electrically operated fuel injection means each associated with a corresponding combustion chamber for injecting fuel into a corresponding air passage to the combustion chamber thereby forming combustible mixture for the combustion chamber, and means responsive to such indication of such deviation for controlling the corresponding fuel injection means such that the corresponding fuel injection means is prevented from injecting fuel.

3. An internal combustion engine as set forth in claim 1 characterized further by spark ignition means for igniting the charges in the combustion chambers in predetermined order, said spark ignition means comprises multiple spark plug means each associated with a corresponding combustion chamber and further including means responsive to such indication of such deviation for preventing the corresponding spark plug means from sparking.

4. An internal combustion engine as set forth in claim 1 characterized further in that said means for detecting when certain one or more of said multiple variables indicates deviation in the operation of any one of said combustion chambers from desired operation comprises means for detecting engine roughness when running.

5. An internal combustion engine as set forth in claim 2 characterized further in that said means for detecting when certain one or more of said multiple variables indicates deviation in the operation of any one of said combustion chambers from desired operation comprises means for detecting when the operation of the corresponding fuel injection means deviates from desired operation.

6. An internal combustion engine as set forth in claim 3 characterized further in that said means for detecting when certain one or more of said multiple variables indicates deviation in the operation of any one of said combustion chambers from desired operation comprises means for detecting when the operation of the corresponding spark plug means deviates from desired operation.

7. An internal combustion engine as set forth in claim 1 characterized further in that said means for detecting when certain one or more of said multiple variables indicates deviation in the operation of any one of said combustion chambers from desired operation comprises means for detecting when the operation of the corresponding valve means deviates from desired operation.

8. An internal combustion engine as set forth in claim 1 characterized further in that said means for detecting when certain one or more of said multiple variables indicates deviation in the operation of any one of said combustion chambers from desired operation comprises means for detecting deviation in the flow of combusted mixture.

9. An internal combustion engine as set forth in claim 1 characterized further in that said multiple electromechanical actuator means comprise multiple solenoid valve means.

10. An internal combustion engine as set forth in claim 1 characterized further by multiple electrically operated fuel injection means each associated with a corresponding combustion chamber for direct injecting fuel directly into the corresponding combustion chamber so that only air, and not the injected fuel, ingresses through the corresponding valve means, the injected fuel and air forming combustible mixture in the corresponding combustion chamber, and means responsive to such indication of such deviation for controlling the corresponding fuel injection means such that the corresponding fuel injection means is prevented from injecting fuel.

11. In an internal combustion engine comprising multiple combustion chambers each of which is repeatedly charged with a fresh combustible fluid mixture charge that is combusted therein to power the engine and subsequently exhausted therefrom, multiple valve means each associated with a corresponding combustion chamber for controlling the ingress and egress of combustible and combusted mixture to and from the corresponding combustion chamber, and multiple electromechanical actuator means each associated with a corresponding one of said valve means for controlling operation of same, electronic computing means for controlling certain components of the engine, including said multiple electromechanical actuator means, in accordance with multiple variables associated with engine operation, a method characterized by detecting when certain one or more of said multiple variables indicates deviation in the operation of any one of said combustion chambers from desired operation, and responding to such indication of such deviation by controlling the electromechanical actuator means associated with the corresponding valve means associated with said any one of said combustion chambers such that the corresponding valve means prevents the ingress of combustible mixture into said any one of said combustion chambers.

12. In an internal combustion engine and method as set forth in claim 11 characterized further by the engine comprising multiple electrically operated fuel injection means each associated with a corresponding combustion chamber for injecting fuel into a corresponding air passage to the combustion chamber thereby forming combustible mixture for the combustion chamber, and by the method comprising responding to such indication of such deviation by controlling the corresponding fuel injection means such that the corresponding fuel injection means is prevented from injecting fuel.

13. In an internal combustion engine and method as set forth in claim 11 characterized further by spark ignition means for igniting the charges in the combustion chambers in predetermined order, said spark ignition means comprising multiple spark plug means each associated with a corresponding combustion chamber, and the method further includes responding to such indication of such deviation for preventing the corresponding spark plug means from sparking.

14. In an internal combustion engine and method as set forth in claim 11 characterized further in that the detecting step comprises detecting engine roughness when running.

15. In an internal combustion engine and method as set forth in claim 12 characterized further in that the detecting step comprises detecting when the operation of the corresponding fuel injection means deviates from desired operation.

16. In an internal combustion engine and method as set forth in claim 13 characterized further in that the detecting step comprises detecting when the operation of the corresponding spark plug means deviates from desired operation.

17. In an internal combustion engine and method as set forth in claim 11 characterized further in that the detecting step comprises means for detecting when the operation of the corresponding valve means deviates from desired operation.

18. In an internal combustion engine and method as set forth in claim 11 characterized further in that the detecting step comprises detecting deviation in the flow of combusted mixture.

19. In an internal combustion engine and method as set forth in claim 11 characterized further by the engine comprising multiple electrically operated direct fuel injection means each associated with a corresponding combustion chamber for direct injecting fuel directly into a corresponding combustion chamber so that only air, and not the injected fuel, ingresses through the corresponding valve means, the injected fuel and air forming combustible mixture in the corresponding combustion chamber, and by the method comprising responding to such indication of such deviation by controlling the corresponding fuel injection means such that the corresponding fuel injection means is prevented from injecting fuel.

* * * * *